(12) United States Patent
Sekretta et al.

(10) Patent No.: US 9,488,203 B2
(45) Date of Patent: Nov. 8, 2016

(54) DISCONNECTABLE SUBSEA CONNECTOR

(71) Applicants: Enginuity Inc., Halifax, Nova Scotia (CA); Oceanside Equipment Limited, Dartmouth, Nova Scotia OT (CA)

(72) Inventors: Gleb Sekretta, Halifax (CA); Benjamin Garvey, Halifax (CA); Lee Babin, Halifax (CA); Daniel Horne, Halifax (CA); Louis-Phillipe Manuge, Halifax (CA); Steven Doiron, Middle Sackville (CA); Martin Gregory Maloney, Bedford (CA); Alastair Trower, Halifax (CA)

(73) Assignees: Enginuity Inc., Halifax, Nova Scotia (CA); Oceanside Equipment Limited, Dartmouth, Nova Scotia (CA)

( * ) Notice: Subject to any disclaimer, the term of this patent is extended or adjusted under 35 U.S.C. 154(b) by 206 days.

(21) Appl. No.: 14/197,223

(22) Filed: Mar. 5, 2014

(65) Prior Publication Data
US 2015/0252626 A1 Sep. 10, 2015

(51) Int. Cl.
*B25G 3/18* (2006.01)
*F16B 21/00* (2006.01)
(Continued)

(52) U.S. Cl.
CPC .............. *F16B 7/0406* (2013.01); *B63B 21/04* (2013.01); *B63B 21/50* (2013.01); *F16B 7/042* (2013.01);
(Continued)

(58) Field of Classification Search
CPC ........ F16B 7/042; F16B 7/04; F16B 7/0406; F16B 21/16; Y10T 403/599; Y10T 403/592; Y10T 403/597; Y10T 403/58; Y10T 403/7071; Y10T 403/7069; Y10T 29/49826; B63B 21/50; B63B 21/04
USPC ......... 403/314, 322.2, 323, 374.5, 300, 302; 411/3, 4; 405/224; 285/321, 286.1, 285/320, 314
See application file for complete search history.

(56) References Cited

U.S. PATENT DOCUMENTS

| | | | |
|---|---|---|---|
| 1,352,665 A | 9/1920 | Healy | |
| 3,588,149 A * | 6/1971 | Demler | F16L 37/084 285/110 |

(Continued)

FOREIGN PATENT DOCUMENTS

| | | |
|---|---|---|
| CA | 2005316 | 6/1990 |
| CA | 2673730 A1 | 2/2010 |

(Continued)

OTHER PUBLICATIONS

First Subsea Ltd, "General Information—First Subsea," 2013, 2 Pages [online] [Retrieved on Jan. 13, 2014] Retrieved from the internet <URL:http://www.firstsubsea.com/products/smc/general-information.html>.

(Continued)

*Primary Examiner* — Chi Q Nguyen
(74) *Attorney, Agent, or Firm* — Kilpatrick Townsend & Stockton LLP

(57) ABSTRACT

The described embodiments provide a subsea connector that is a quickly deployable and reusable. The subsea connector comprises a male and a female assembly that can be connected and disconnected. The male assembly includes a shaft, a sleeve that surrounds the shaft, and bars that are connected to the shaft and are configured to rotate about one axis. The female assembly includes a receptacle into which the male assembly can fit. Once the male assembly is inserted into the female assembly, the bars can rotate into such a position that the male and female assemblies are connected together. The bars can also be rotated such that the male and female assemblies can be disconnected.

21 Claims, 8 Drawing Sheets

(51) Int. Cl.
  *F16D 1/00* (2006.01)
  *F16B 7/04* (2006.01)
  *F16B 21/16* (2006.01)
  *B63B 21/04* (2006.01)
  *B63B 21/50* (2006.01)

(52) U.S. Cl.
  CPC .......... *F16B 21/16* (2013.01); *Y10T 29/49826* (2015.01); *Y10T 403/7069* (2015.01); *Y10T 403/7071* (2015.01)

(56) References Cited

U.S. PATENT DOCUMENTS

| | | | |
|---|---|---|---|
| 6,082,283 A | 7/2000 | Parker | |
| 8,500,358 B1 | 8/2013 | Cassidy | |
| 2003/0001386 A1* | 1/2003 | Cresswell | F16L 37/088 285/305 |
| 2003/0044240 A1 | 3/2003 | Bergeron | |
| 2003/0062033 A1* | 4/2003 | Martin | F16B 21/165 124/23.1 |
| 2005/0082828 A1* | 4/2005 | Wicks | A61M 39/105 285/319 |
| 2005/0196231 A1* | 9/2005 | McKay | F16B 7/04 403/364 |
| 2007/0155259 A1 | 7/2007 | Van Tol et al. | |
| 2008/0007056 A1 | 1/2008 | Beesley | |
| 2009/0140519 A1* | 6/2009 | Pavnaskar | F16L 37/23 285/308 |
| 2009/0188575 A1* | 7/2009 | Williams | F16L 37/0985 137/798 |
| 2010/0078934 A1* | 4/2010 | Matsunaga | F16L 37/0987 285/316 |
| 2013/0146278 A1 | 6/2013 | Yajure | |

FOREIGN PATENT DOCUMENTS

| | | |
|---|---|---|
| EP | 0461819 A2 | 12/1991 |
| EP | 1226068 B1 | 4/2004 |
| EP | 2414217 A1 | 4/2013 |
| EP | 2492183 B1 | 8/2013 |
| WO | WO 2004/055394 A1 | 7/2004 |
| WO | WO 2007/124999 A1 | 11/2007 |
| WO | WO 2010/112603 A1 | 10/2010 |
| WO | WO 2013/093455 A1 | 6/2013 |

OTHER PUBLICATIONS

First Subsea Ltd, "SMC—First Subsea," 2013, 1 Page [online] [Retrieved on Jan. 13, 2014] Retrieved from the internet <URL:http://www.firstsubsea.com/products/smc.html>.
First Subsea Ltd, "Subsea Mooring Connector," Brochure, 2013, 2 Pages.
Balltec, "Features and benefits of MoorLOK™," Retrieved on Jan. 13, 2014, 2 pages.
Balltec, "MoorLOK Subsea Mooring Connectors—Balltec : Mooring, pipeline recovery," 2014, 2 pages [online] [Retrieved on Jan. 13, 2014] Retrieved from the internet <URL:http://www.balltec.com/balltec-products/balltec-products-moorlok>.
PCT/IB2015/000971, "International Search Report and written opinion", mailed Sep. 22, 2015, 9 pages.

* cited by examiner

DISCONNECTABLE SUBSEA CONNECTOR

BACKGROUND

The field of the disclosure relates generally to subsea equipment, and more particularly to connectors for use with subsea equipment.

Mooring systems designed for long term use as deployed in offshore oil and gas, wind farms, aids to navigation and other offshore deployments, are subject to extreme weather events, prolonged exposure to sea water and are designed to withstand extreme loading. Installation of any component in an offshore location is expensive, typically requiring multiple installation vessels, meticulous planning and allowances for weather and sea conditions. Installation costs can easily become $100,000 per day. As a result, the offshore installation industry and by definition, their clients, are interested in making the installation process more efficient and less risky from a health, safety, and environmental perspective.

Quick connection systems have been used for over a decade in the installation of drilling rigs and production units in the offshore oil and gas industry. Quick connection systems are favored by the offshore installation industry as they reduce the time and therefore the cost of the installation, and because they also allow mooring lines to be pre-laid on the sea floor ahead of the arrival of the platform being deployed. In addition, quick connection systems allow the anchor system for the mooring line to be preinstalled before the mooring line is connected to the subsea connector. This is a more efficient installation process as the installer can decouple the installation of the major components of the mooring system from the critical path of the platform installation, which is often plagued with cost and time overruns.

The existing designs of quick connectors rely on ball and taper technology where a male component into which steel ball bearings are embedded is inserted into a female connector. The steel balls are free to roll against an inclined plane on the male component, and so applying tension on the male component causes the steel balls to jam against the walls of the female connector. This jamming action of the steel ball bearings causes the male component to be held firmly in the female connector. By the nature of this design, the female portion of the connector is distorted during the connection process, thus potentially affecting the component's performance and its ability to be disconnected. Despite this distortion that occurs, these existing designs are marketed as being disconnectable. The ability to disconnect mooring lines is advantageous, as mooring lines can more easily be repaired in the event of a failure of another component in the mooring system. This is becoming more important as the offshore industry extends into deeper water and as the installed infrastructure is aging. However, due to the potential for distortion during connection and use, the disconnectable nature of the existing designs is unproven during real world use.

The design of mooring systems is also becoming more complex with a large variety of connectors, and with wire, chain and polyester fiber sections, meaning that a greater number of potential failure mechanisms are now possible. The existing designs utilize different material types that can be prone to galvanic corrosion. The different material types may also degrade at different rates that could affect long term performance of the device. The existing designs are very expensive, but are an alternative to manual connection methods, such as H-links and shackles. However, it would be desirable to have a device that is quickly deployed with a low failure of connection, minimal moving parts, fewer materials, and is inherently disconnectable, while being more cost-effective than the existing designs.

SUMMARY

The described embodiments provide a subsea connector that is a quickly deployable and reusable. Depending on the scale of the device, the subsea connector can be used to connect two free ends of any mooring device, for example, boats, oil platforms, wind farms, buoys, subsea architecture, or other mooring jewelry.

The subsea connector comprises a male and a female assembly that can be connected and disconnected. The male assembly includes a shaft, a sleeve that surrounds the shaft, and bars that are connected to the shaft and are configured to rotate about one axis. The female assembly includes a receptacle into which the male assembly can fit. Once the male assembly is inserted into the female assembly, the bars can rotate into such a position that the male and female assemblies are connected together. The bars can also be rotated such that the male and female assemblies can be disconnected.

The subsea connector described throughout generally has a variety of advantages over the prior designs. For example, it is designed to be relatively low cost, reusable and rapidly deployable to reduce the expense of deployment. It is designed to be deployable in a variety of sea states and also to be deployed in very deep water utilizing currently available remotely operated vehicle (ROV) technology. The device is designed to be easy to use and failsafe to deploy, disconnect and redeploy. It is designed to remain fully intact upon loading and not to deform during extreme loading events, thereby ensuring fitness for purpose during design life. The device is designed to be fully inspectable during its working life. Load bearing areas can be inspected using established visual inspection techniques, and a quantitative inspection technique will be defined and recommended for in-service inspection.

DETAILED DESCRIPTION

Figure 1:
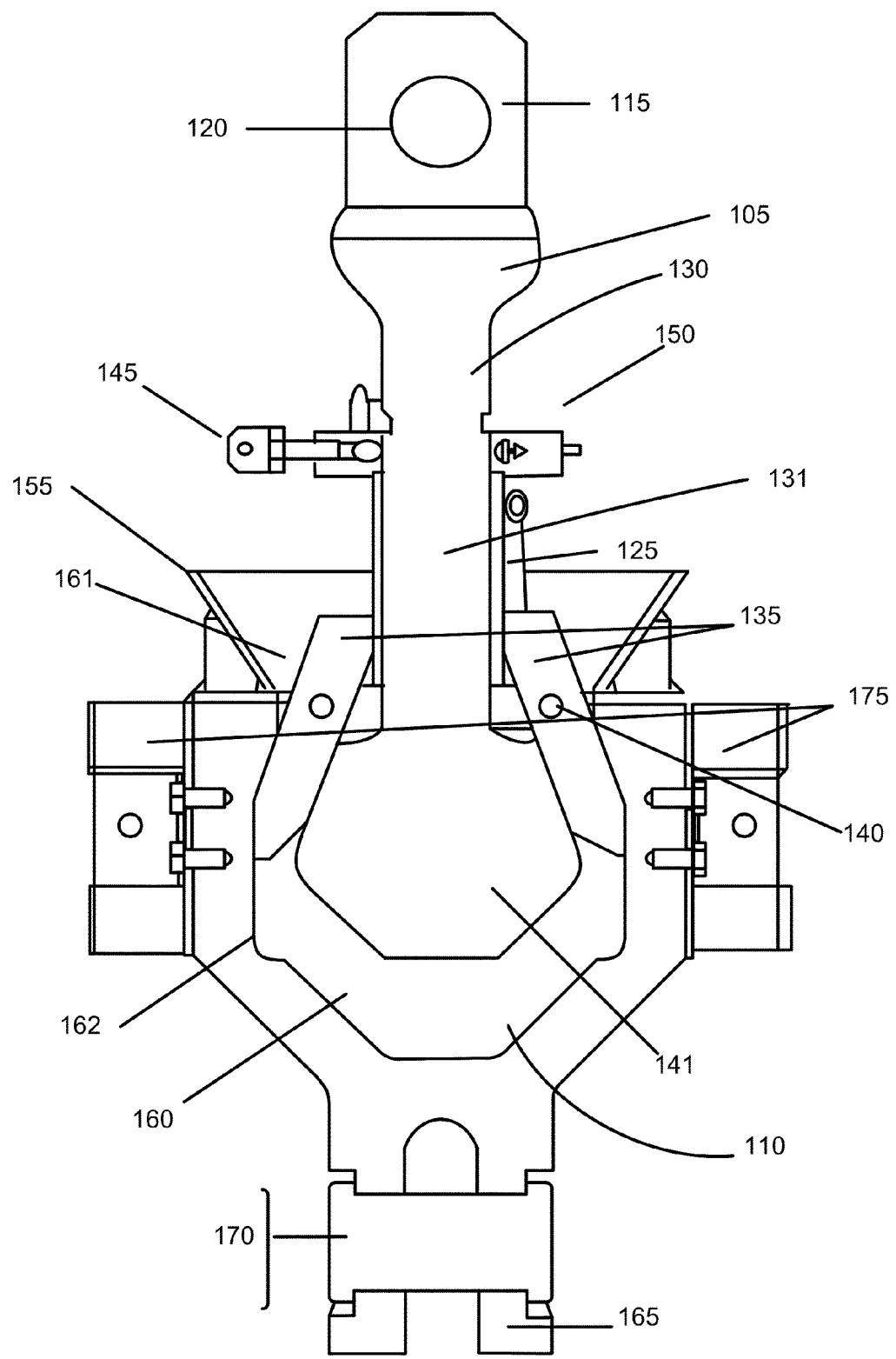
FIG. 1 illustrates a cross-sectional diagram of male and female components of a subsea connector in accordance with one embodiment.

FIG. 1 shows a cross-sectional diagram of the male and female components of an embodiment of a subsea connector. The subsea connector includes a male assembly 105 and a female assembly 110. The male assembly 105 in the embodiment of FIG. 1 includes a clevis 115, a clevis pin 120, a pawl sleeve 125, a connector shaft 130, a plurality of locking pawls 135, a plurality of locking pins 140, a locking bulb 141, a secondary locking system 145, and a locking groove 150. The female assembly 110 in the embodiment of FIG. 1 includes a guide funnel 155, a containment cup 160, a clevis 165, a clevis pin 170, and a plurality of deployment wings 175. This is just one example of components that might be included in each of these assemblies. More, fewer, or different components can be included, as well. In addition, the components can have different sizes and shapes than those included here.

In a typical offshore mooring configuration, the male assembly 105 will be connected to a principle mooring chain. The female assembly 110 will be connected to a short length of anchor pile chain. In other connection scenarios, the male and female assemblies will be connected to sections of chain at any point in a connection assembly. The male assembly comprises a clevis 115 designed to provide connection to a chain, wire or fiber rope. The end link of a chain or connector is fed into the clevis until the clevis pin 120 can be locked in place to provide a permanent connection. In another embodiment, the male and female ends are connected to the chain by way of a shackle or H-link.

Figure 2:
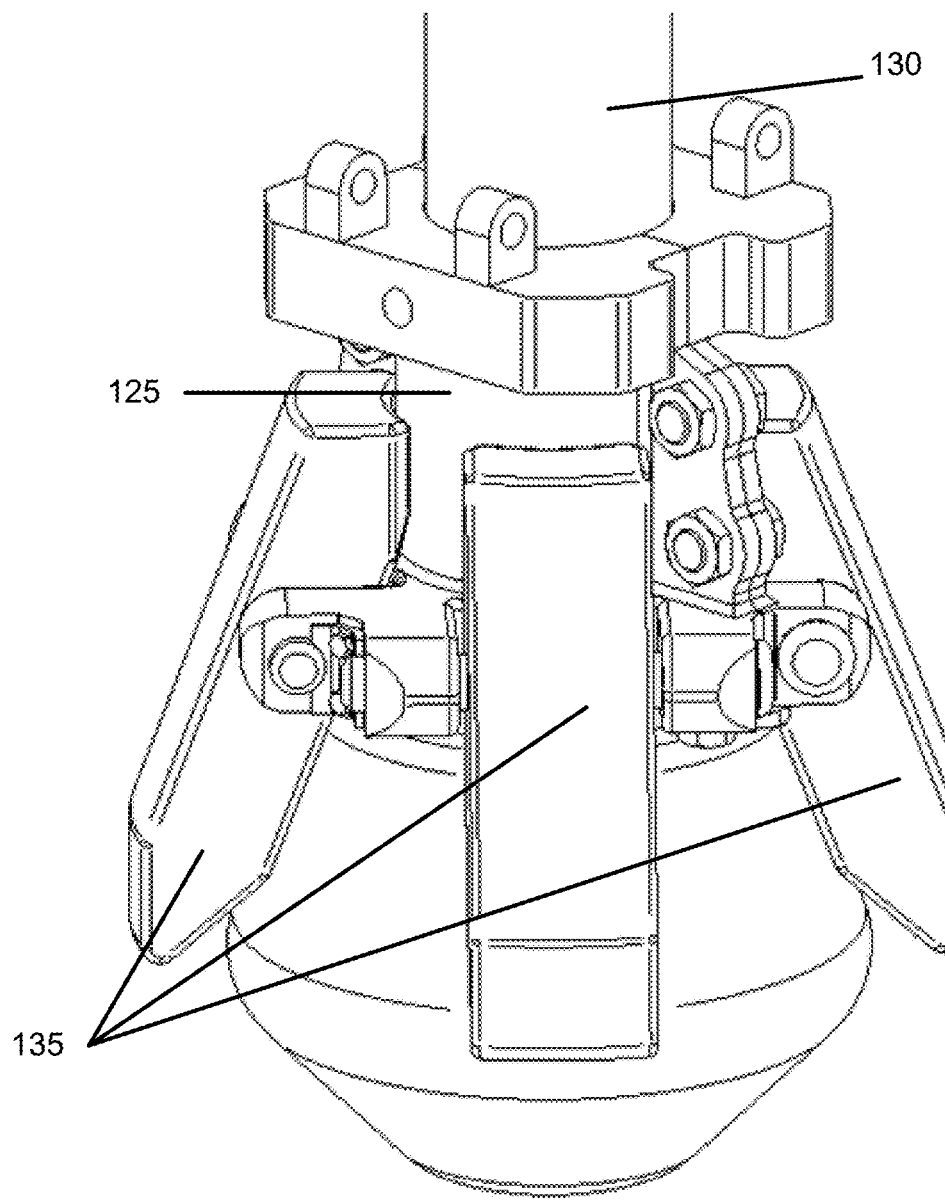
FIG. 2 illustrates a side view of the male component of the subsea connector in accordance with one embodiment.

The male assembly includes connector shaft 130 having a body 131 and a locking end or bulb 141. The male assembly also comprises a pawl sleeve 125 that surrounds a connector shaft 130. In one embodiment, the pawl sleeve 125 comprises two sections that are bolted together to lock around the connector shaft 130. Four locking pawls 135 are secured to the pawl sleeve 125 in an annulus around the connector shaft 130, as shown in FIG. 2. Other embodiments of the invention may comprise more or fewer locking pawls secured to the pawl sleeve 125, and they can be arranged in various ways around the connector shaft 130. In one embodiment, the locking pawls 135 are made of machined steel. The locking pawls 135 are bar shaped in the embodiment of FIG. 1, though other shapes, lengths, widths, etc. can also be used. The bars or locking pawls 135 can rotate freely about the axis of the locking pins 140 that secure the locking pawls 135 to the pawl sleeve 125. For example, the locking pawls 135 can be designed to rotate or pivot about one axis such that one end of each of the pawls 135 extends away from the shaft 130 or folds back in toward the shaft 130.

In FIG. 1, the locking pawls 135 are depicted in their neutral position. In this position, the locking pawls 135 rest against the locking end or bulb 141 of the shaft 130. The containment cup 160 or receptacle of the female assembly has an opening 161 on one end (e.g., an upper end) into which the male assembly is inserted. The containment cup 160 or receptacle also has at least one wall 162 that forms the interior of the containment cup 160. The locking pawls 135 interface with the female assembly 110 (e.g., the one or more interior walls of the containment cup 160) and the locking bulb 141 of the shaft 130 to provide the main tension and compression locking force that secures the male assembly 105 to the female assembly 110. The locking bulb 141 is an extension of the connector shaft 130 that has a larger diameter or cross-sectional area than the connector shaft 130 or than the body of the connector shaft 130. In general, FIG. 1 illustrates just one example of shapes of the locking bulb 141 and connector shaft 130 of the male assembly and the containment cup 160 or receptacle of the female assembly that might fit together, though other shapes can be used that provide a similar type of locking feature.

The upper end of the pawl sleeve 125 includes a secondary locking system 145 that fixes the position of the pawl sleeve 125 relative to the connector shaft 130. This prevents the male and female assemblies from disconnecting when a tension load is not present. In one embodiment, the secondary locking system 145 comprises a pin that is configured to engage with a locking groove 150 on the connector shaft 130, as is illustrated in FIG. 1. Various other locking mechanisms involving pins and grooves or other components could also be used to secure the pawl sleeve 125 in place and prevent it from moving along the connector shaft 130.

The female assembly 110 includes a guide funnel 155 located above a receptacle or containment cup 160. The lower end of the female assembly 110 tapers down and terminates in a second clevis 165. The second clevis 165, in conjunction with a second clevis pin 170, provides a mechanism to allow the connection of the female assembly 110 with a bottom chain segment or connector. The female assembly 110 also includes a set of deployment wings 175 that stabilize the female assembly 110 within a connector deployment assembly, such as the one depicted in FIG. 3. The set of deployment wings 175 are tabs that protrude from the female assembly, though other designs can also be used.

In a preferred embodiment, the male assembly 105 and female assembly 110 are constructed of materials that are resistant to galvanic corrosion in the presence of sea water. In another embodiment, the male assembly 105 and female assembly 110 are constructed in such a way that any materials that are in contact, and are not resistant to galvanic corrosion, are protected by an insulating substance.

Figure 3:
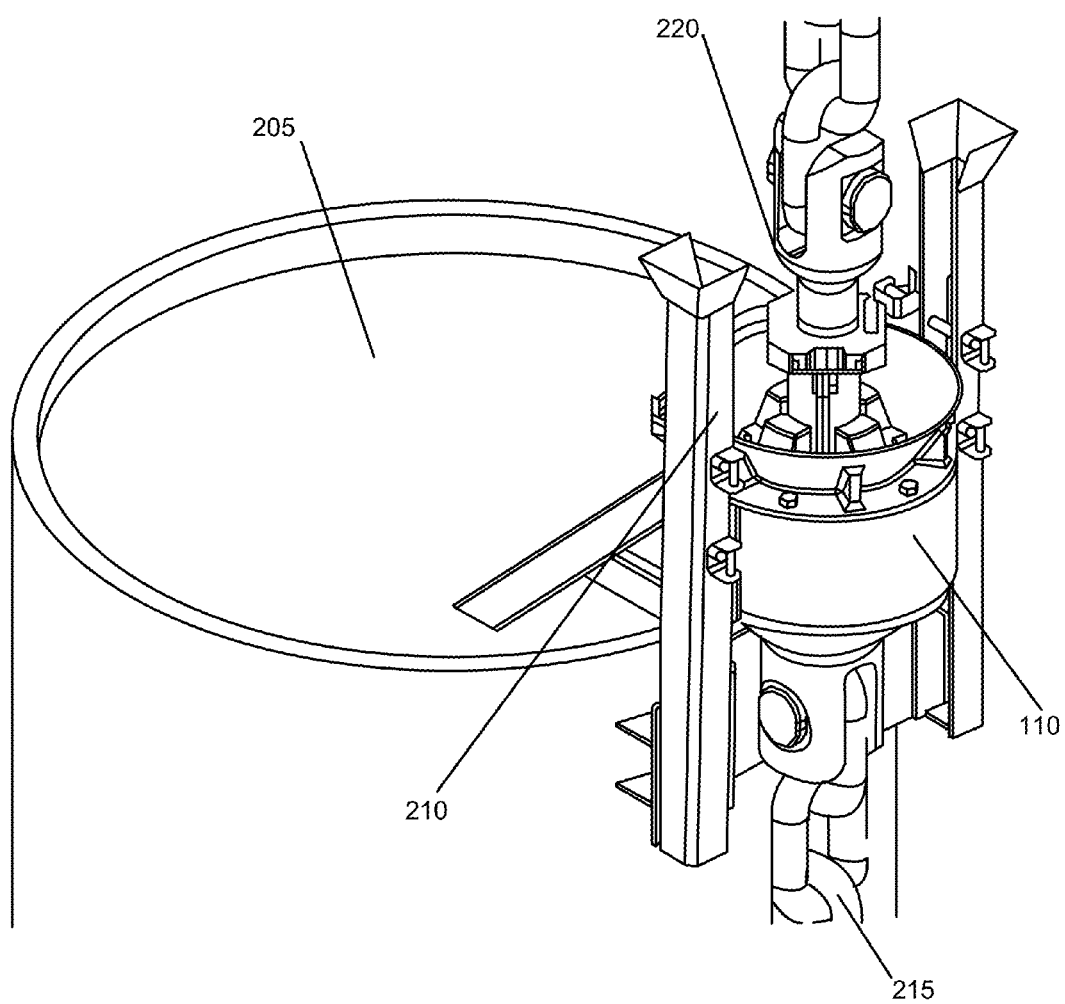
FIG. 3 illustrates an isometric diagram of an example deployment of the subsea connector in accordance with one embodiment.

FIG. 3 shows an isometric view of a typical offshore connection scenario wherein the female assembly 110 is attached to a mooring anchor pile 205 via the use of a connector deployment assembly 210. The connector deployment assembly 210 comprises a framework that is built as a part of the mooring anchor pile 205. The female assembly 110 rests in the connector deployment assembly 210 and is held in place by the deployment wings 175. A lower mooring chain 215 is attached to the female assembly 110. During the connection process the male assembly 105, attached to an upper mooring chain 220, is lowered down into the female assembly 110 such that the locking pawls 135 and locking bulb 141 are inserted into the containment cup 160.

As soon as tension is applied to the male assembly 105, the locking pawls 135 engage the locking bulb 141 and the containment cup 160, and the secondary locking system 145 can be activated. The engagement of the secondary locking system 145 prevents the connector from disassembling if the tension on the subsea connector is released. As the upper mooring chain 220 is raised, the deployment wings 175 disengage from the connector deployment assembly 210. The lower and upper mooring chains are now connected and will remain so until the subsea connector is unlocked.

Figure 4:
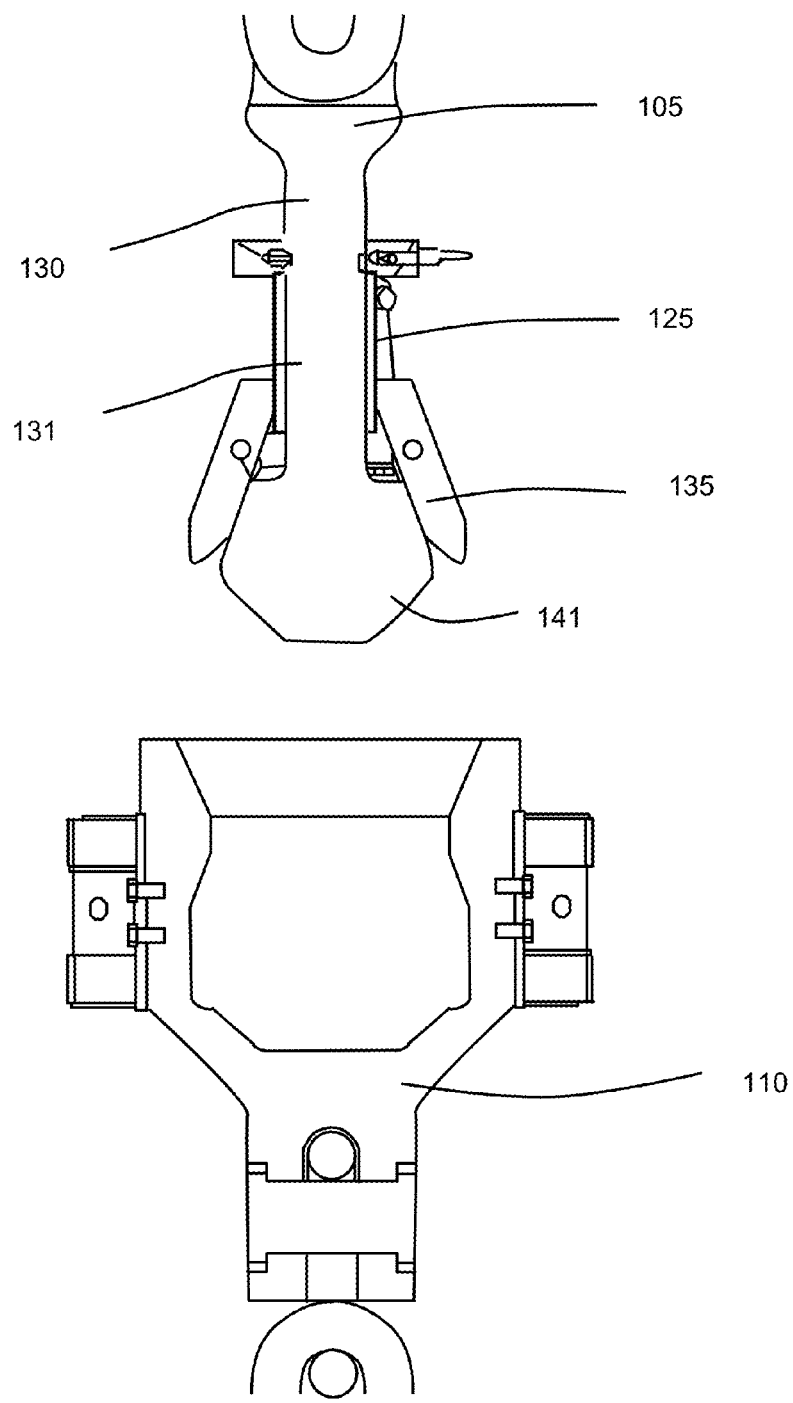
FIG. 4 illustrates a cross-sectional diagram of the separated male and female components of the subsea connector in accordance with one embodiment.
Figure 5:
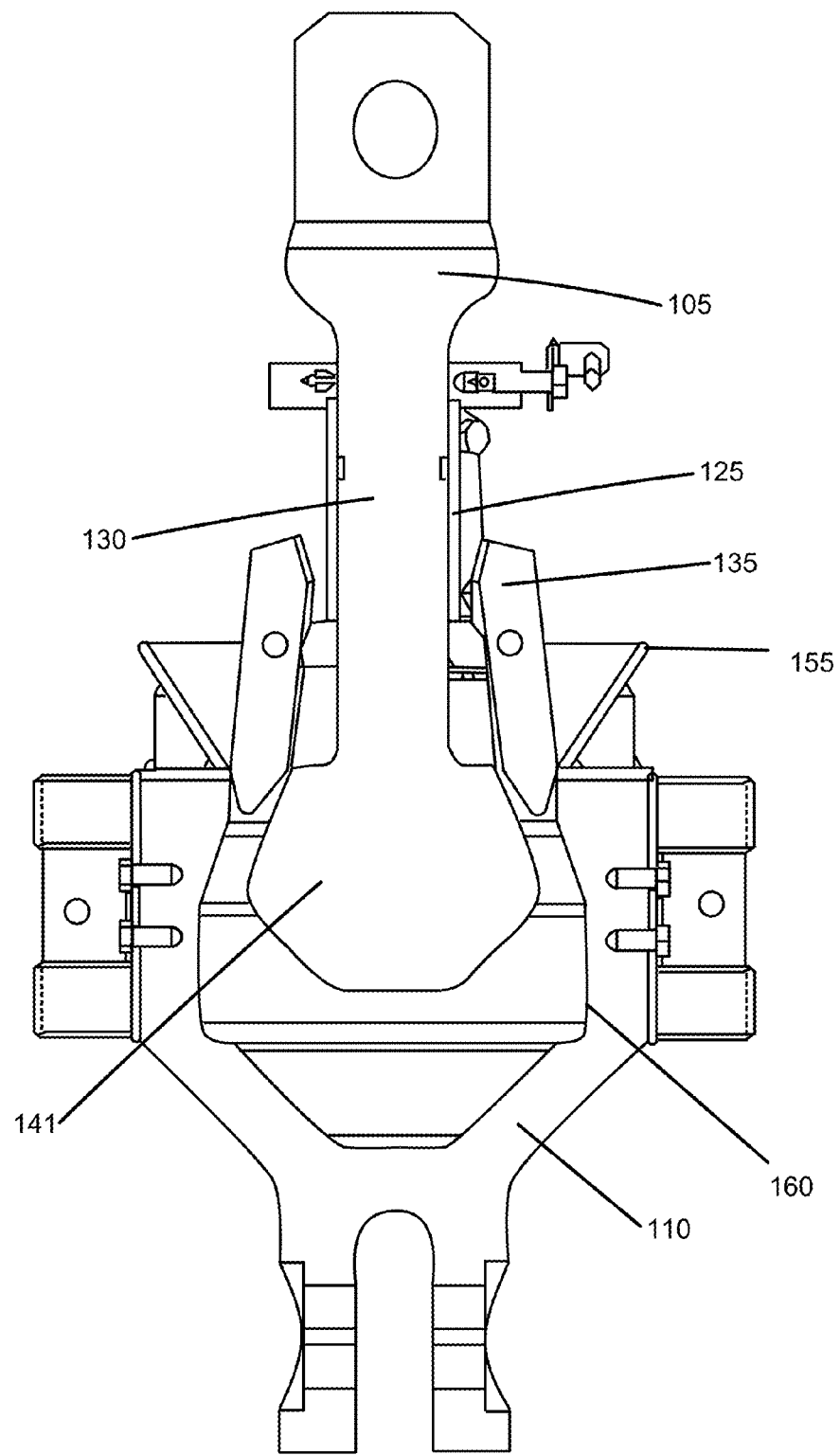
FIG. 5 illustrates a cross-sectional diagram of stage one of the connection process in accordance with one embodiment.
Figure 6:
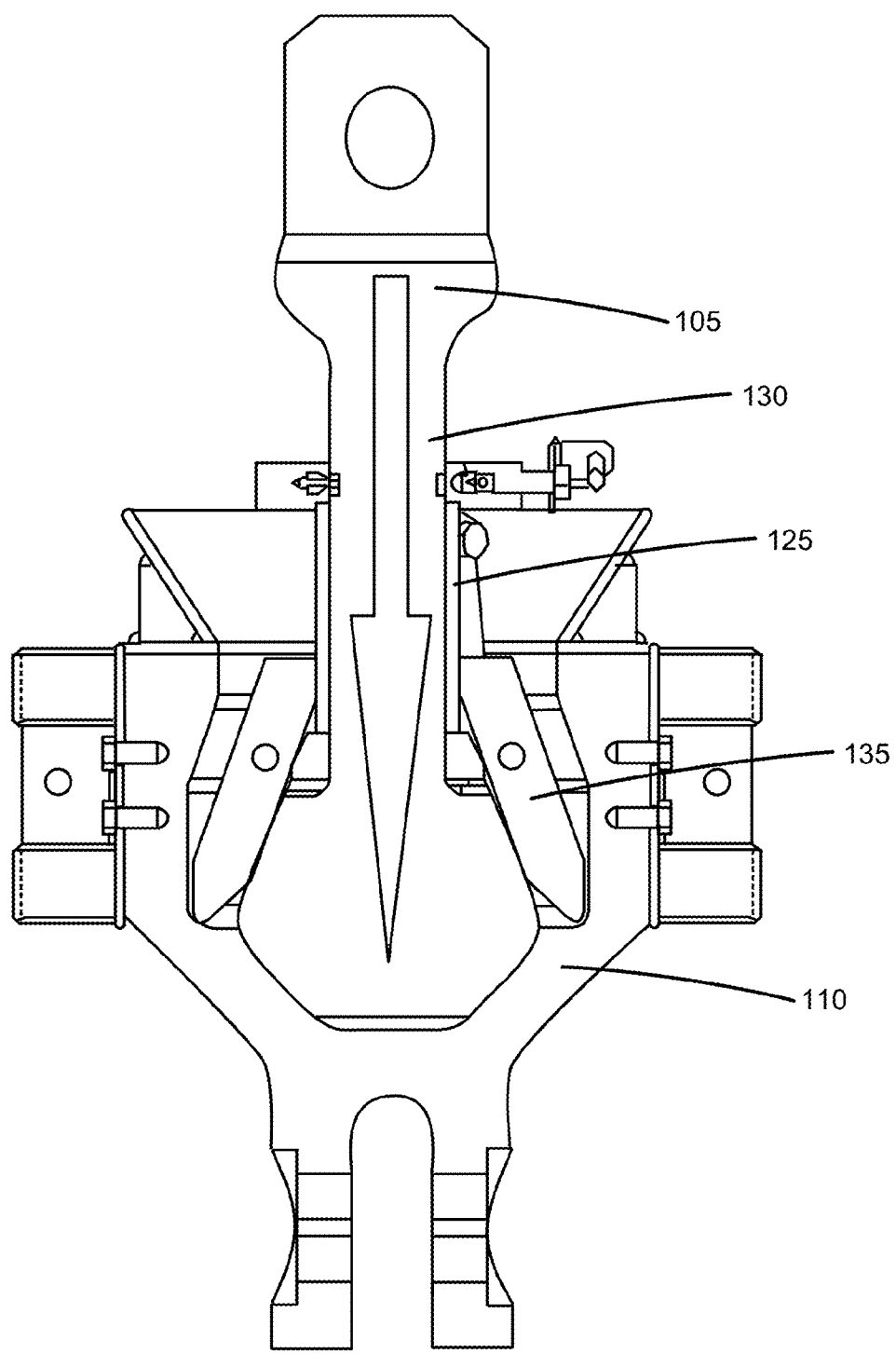
FIG. 6 illustrates a cross-sectional diagram of stage two of the connection process in accordance with one embodiment.

FIGS. 4 through 6 illustrate the connection process for the male and female assemblies of the subsea connector. FIG. 4 shows a cross-sectional diagram of subsea connector before the connection process begins. The male assembly 105 is completely separated from the female assembly 110. The pawl sleeve 125 is fully lowered along the body 131 of connector shaft 130, and the locking pawls 135 are resting against the locking bulb 141.

FIG. 5 shows a cross-sectional diagram of subsea connector in stage one of the connection process. The male assembly 105 of the subsea connector is lowered towards the female assembly 110. The locking pawls 135 contact the funnel 155 and slide along the inner edge of the funnel 155. The inner edge of the guide funnel 155 pushes the locking pawls 135 in towards the connector shaft 130, forcing the pawl sleeve 125 to slide upwards along the connector shaft 130, thereby allowing the shaft bulb 141, pawl sleeve 125, and locking pawls 135 to enter the containment cup 160. When the sleeve is pushed upward, the locking pawls 135 are lifted above the locking bulb 141 such that the tips of the locking pawls 135 are near the upper edge of the locking bulb 141. The lifting of the locking pawls 135 causes them to slide along the upper surface of the locking bulb 141. The locking pawls 135, while sliding along the locking bulb 141 also pivot about the locking pins 140 that connect the locking pawls to the sleeve such that the tips of the locking pawls closest to the locking bulb 141 fold inward, toward the connector shaft 130. FIG. 4 illustrates this lifted and folded position of the locking pawls and pawl sleeve. The tips of the locking pawls are now positioned such that they point into the receptacle of the female assembly and are no longer extended outward as they were before in a fashion that prevented entry of the male assembly into the receptacle. Thus, the folded locking pawls plus locking bulb can now slide downward into the receptacle.

FIG. 6 shows a cross-sectional diagram of subsea connector in stage two of the connection process. As the male assembly 105 is further lowered into the female assembly 110, the pawl sleeve 125 slides down the connector shaft 135. The locking pawls 135 also slide down along the locking bulb 141, which causes the locking pawls to pivot about the locking pins 140 such that the tips of the locking pawls closest to the locking bulb 141 fold outward, away from the connector shaft. This allows the pawl sleeve 125 to slide down the connector shaft 130 into the locked position. FIG. 6 illustrates the pawl sleeve 125 and locking pawls 135 in this lowered and locked position.

Figure 7:
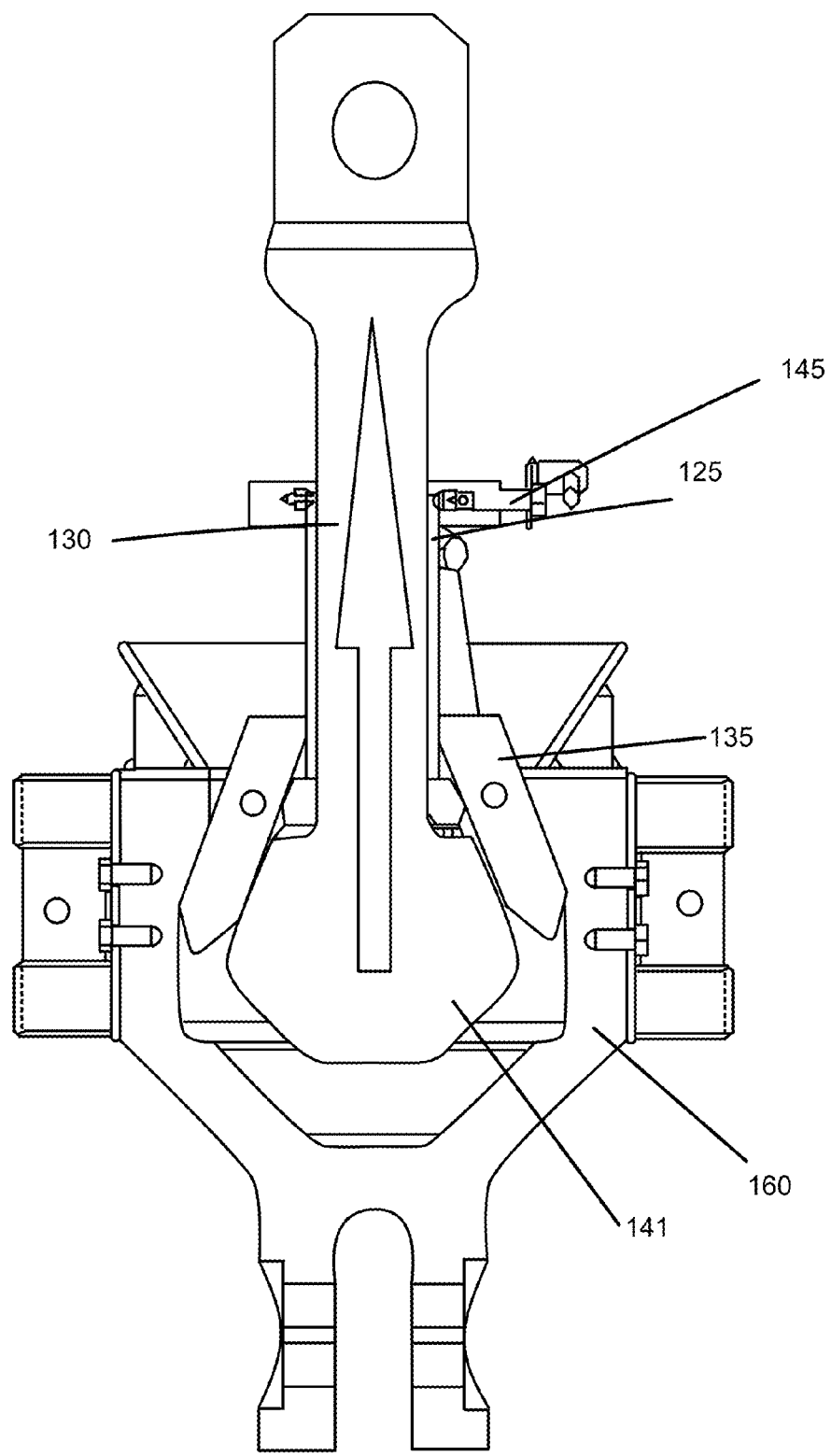
FIG. 7 illustrates a cross-sectional diagram of stage three of the connection process in accordance with one embodiment.

FIG. 7 shows a cross-sectional diagram of the subsea connector in stage three of the connection process. Following insertion of the male assembly 105 into the female assembly 110, the secondary locking system 145 is engaged, which prevents the pawl sleeve 125 from sliding upward along the connector shaft 130. Securing the pawl sleeve 125 in the lowered position keeps the locking pawls 135 pressed against the locking bulb 141. This prevents the locking pawls 135 from rotating such that the tips of the locking pawls 135 closest to the locking bulb 141 move inward toward the connector shaft 130. As tension is applied to the male assembly 105, the locking pawls 135 are jammed between the locking bulb 141 and the inside walls of the containment cup 160. The tension load is borne by the locking pawls 135 in compression and is passed as hoop stress through the walls of the containment cup 160. The male assembly 105 and female assembly 110 are now connected and cannot be disconnected unless the secondary locking system 145 is disengaged and tension on the male assembly is removed. In order to disconnect the male assembly 105 and female assembly 110, the secondary locking system 145 must be disengaged. Then, the tension on the male assembly 105 must be removed, allowing the male assembly 105 to drop further into the female assembly 110 and relieving the pressure on the locking pawls 135. FIG. 5 depicts the male assembly 105 dropped further into the female assembly 110. Once the locking pawls 135 are no longer jammed between the locking bulb 141 and the inside walls of the containment cup 160, the pawl sleeve 125 and locking pawls 135 are free to slide upward along the connector shaft 130. As the locking pawls 135 slide along the locking bulb 141, the locking pawls 135 rotate in such a way that the tips of the locking pawls 135 that are closest to the locking bulb 141 fold inward toward the connector shaft 130. This allows the male assembly 105, with the folded locking pawls 135, to slide out of the female assembly 110. The male assembly 105 and female assembly 110 are now disconnected.

Figure 8C:
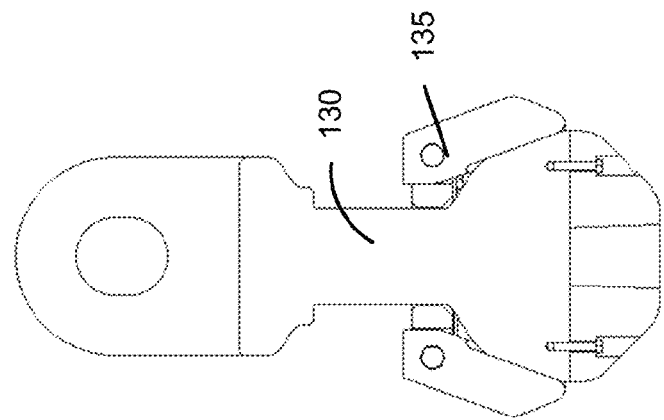
FIG. 8C illustrates a cross-sectional view of the male component of the subsea connector in accordance with one embodiment
Figure 8B:
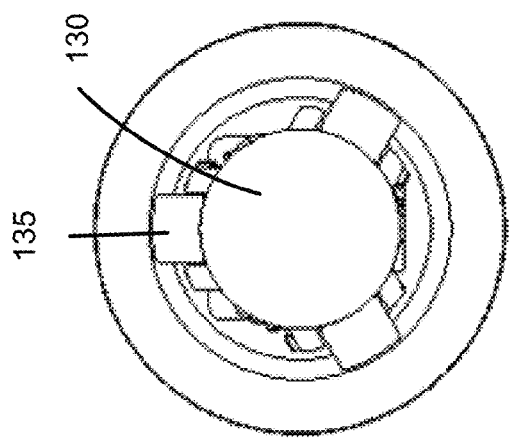
FIG. 8B illustrates a bottom view of the male component of the subsea connector in accordance with one embodiment
Figure 8A:
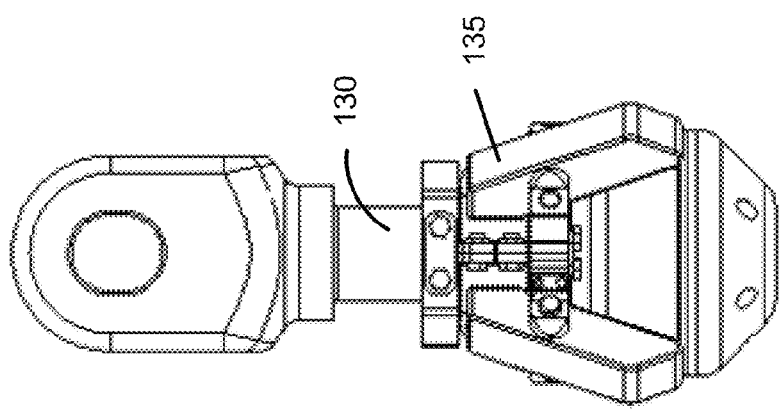
FIG. 8A illustrates a side view of a male component of a subsea connector in accordance with one embodiment

FIG. 8A shows a diagram of a specific embodiment of the male assembly 105 of the subsea connector with only three locking pawls 135, as opposed to the four locking pawls 135 depicted previously. The locking pawls 135 are arranged in an annulus around the connector shaft 130. A male assembly 105 with only three locking pawls 135 can provide additional stability over a male assembly 105 with four locking pawls, because a male assembly 105 with three locking pawls will only have three contact surfaces with the female assembly. This ensures that all three locking pawls 135 will always be in contact with the inner wall 162 of the female assembly 110. FIG. 8B shows a top down diagram of the embodiment of the male assembly 105 depicted in FIG. 8A. The locking pawls 135 are visibly arranged in an annulus around the connector shaft 130. The embodiment depicted in FIGS. 8A and 8B operate in the same manner depicted in FIGS. 4 through 7.

FIG. 8C shows a diagram of a specific embodiment of the male assembly 105 of the subsea connector with four locking pawls and a shorter connector shaft 130 than depicted in previous embodiments. The shortened connector shaft 130 reduces the overall weight of the subsea connector, decreases manufacturing cost, and makes the subsea connector easier to construct. Shortening the length of the connector shaft 130 does not change the operation of the subsea connector, and the embodiment depicted in FIG. 8C operates in the same manner depicted in FIGS. 4 through 7.

In addition to the embodiments specifically described above, those of skill in the art will appreciate that the invention may additionally be practiced in other embodiments. For example, in an alternative embodiment, the male assembly 105 may have a fewer number of locking pawls 135. Such a design would likely be used in an application that needs to withstand less force. In another embodiment, a device other than a clevis may be used to connect the male and female assemblies to the mooring line, such as an H-link or a shackle. Different embodiments of the subsea connector may allow for connection to mooring materials other than chain, such as fiber or wire rope. The subsea connector may be scaled to be utilized outside the scope of the offshore installation industry. The subsea connector can be adapted to a variety of dynamic fitting requirements between stationary and moving articles at sea, such as docks, pipelines, vessels, anchors, mooring blocks, and subsea assets. The subsea connector can also be adapted for use in lifting applications such as shipping containers, loading skids, heavy equipment, deployment equipment, and craning operations.

Although this description has been provided in the context of specific embodiments, those of skill in the art will appreciate that many alternative embodiments may be inferred from the teachings provided. Furthermore, within this written description, the particular naming of the components, capitalization of terms, etc., is not mandatory or significant unless otherwise noted, and the mechanisms that implement the described invention or its features may have different names, formats, or protocols.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A connector device comprising:
    a male assembly comprising:
        a shaft having a body and having a locking end with a cross-sectional area that is larger than the body,
        a sleeve that surrounds the shaft, and
        a plurality of bars, each of the bars being pivotally connected to the sleeve; and
    a female assembly comprising:
        a receptacle having an opening for receiving the male assembly, the receptacle including at least one wall configured such that, upon insertion of the male assembly into the female assembly, the plurality of bars react against the locking end of the shaft and the at least one wall of the receptacle to prevent the male assembly and the female assembly from separating,
    wherein the sleeve is slidable along the shaft to reconfigure the male assembly between a first configuration in which the plurality of bars are oriented to accommodate insertion of the male assembly into the receptacle and a second configuration in which the plurality of bars are oriented to block removal of the male assembly from the receptacle.

2. The connector device of claim 1, wherein each of the plurality of bars includes a locking pin that attaches the bar to the sleeve, the locking pin configured to allow an end the bar to rotate to extend outward from the shaft in order to react against the locking end of the shaft and at least one wall of the receptacle.

3. The connector device of claim 2, wherein the locking end of the shaft has a sloping surface configured to cause the plurality of bars to extend outward from the shaft.

4. The connector device of claim 1, wherein the plurality of bars are arranged in an annulus around the shaft.

5. The connector device of claim 4, wherein the plurality of bars comprises three of the bars.

6. The connector device of claim 5, wherein the plurality of bars comprises four of the bars.

7. The connector device of claim 5, wherein each of the bars has a curved surface configured to interface with the at least one wall of the receptacle, the curved surface having a shape complementary to the at least one wall of the receptacle.

8. The connector device of claim 1, wherein reconfiguring the male assembly from the second configuration to the first configuration folds the plurality of bars inward toward the shaft.

9. The connector device of claim 1, wherein reconfiguring the male assembly from the first configuration to the second configuration reorients the plurality of bars to extend outward from the shaft.

10. The connector device of claim 1, wherein the sleeve further comprises a locking system that can be engaged to prevent the sleeve from moving relative to the shaft.

11. The connector device of claim 10, wherein the locking system comprises a pin configured to engage with a locking groove on the shaft to prevent the sleeve from moving relative to the shaft.

12. The connector device of claim 10, wherein the locking system is configured to lock the sleeve in a position such that the plurality of bars extend outward from the shaft and prevent the male assembly and female assembly from separating.

13. The connector device of claim 1, wherein the female assembly further comprises a funnel on the receptacle configured to guide the male assembly into the receptacle.

14. The connector device of claim 13, wherein the funnel is positioned around the opening of the receptacle and extends outward from the receptacle such that the plurality of bars contacting the funnel cause the sleeve to slide away from the locking end, allowing the plurality of bars to fold inward toward the shaft and allowing the male assembly to fit within the receptacle.

15. The connector device of claim 1, wherein the female assembly is configured to rest in a framework during a connection process between the male assembly and the female assembly.

16. The connector device of claim 15, wherein the female assembly further comprises a plurality of tabs that protrude from the female assembly and are configured to stabilize the female assembly within the framework.

17. The connector device of claim 1, wherein one or both of the male assembly and the female assembly further comprise a clevis.

18. The connector device of claim 1, wherein the male assembly and the female assembly are constructed of materials that are resistant to galvanic corrosion in the presence of sea water.

19. The connector device of claim 1, wherein the male and female assemblies are disconnectable in a manner that allows for subsequent reconnectability of the male and female assemblies.

20. A method of using the device of claim 1, the method comprising:
    contacting male assembly with the receptacle of the female assembly, so as to force the sleeve to slide along the shaft away from the locking end, the sliding of the sleeve causing the plurality of bars to pivot inward toward the shaft such that the plurality of bars are positioned to fit into the receptacle of the female assembly; and
    lowering the male assembly into the receptacle until the plurality of bars contact an area of the receptacle that allows the plurality of bars to pivot outward away from the shaft, the pivoting allowing the sleeve to slide along the shaft toward the locking end to lock the male assembly in place.

21. The method of claim 20, further comprising engaging a locking system that prevents the sleeve from sliding along the shaft so as to prevent the male and female assemblies from disconnecting.

* * * * *